June 11, 1968   R. HILDEBRAND   3,387,381
AIR DRIER FOR STACKED MATERIALS
Filed Jan. 11, 1967

INVENTOR
Robert Hildebrand
By
Watson, Cole, Grindle & Watson
Attys.

3,387,381
AIR DRIER FOR STACKED MATERIALS
Robert Hildebrand, Nuertinger Str. 68, Oberboihingen,
Wurttemberg, Germany
Filed Jan. 11, 1967, Ser. No. 608,588
Claims priority, application Germany, Jan. 12, 1966,
H 58,216
6 Claims. (Cl. 34—66)

ABSTRACT OF THE DISCLOSURE

A large air drier of a very simple construction comprising successive preheating, drying, and cooling zones through which stacked materials may be moved intermittently, and which may be operated at a low cost by preheating the fresh air which is added to the heated air circulating within the drying zone by first drawing this air from the outside through the cooling zone.

---

The present invention relates to a large air drier, especially for sawed timber, which is provided with a preheating zone and a drying zone along which an air-circulating channel extends into which a fresh-air inlet channel terminates and from which the entire drying air after being heated is conducted into one end of the drying zone so as to flow in the direction opposite to that in which the material to be dried is passed intermittently through the drier, while a part of the drying air is branched off the circulating current at the other end of the drying zone and passed through the preheating zone and then to the outside. This drier may be employed not only for drying sawed timber but also any other materials which may be stacked or piled on each other in baskets or carriages through which currents of drying air may be conducted.

It is an object of the present invention to provide a drier of the above-mentioned type which is designed so as to permit the fresh air which has to be added to the heated drying air circulating within the drying zone to be effectively preheated at the lowest possible cost and then to be conducted in a very simple and efficient manner to the most suitable point of the drying zone.

For attaining this object, the invention provides that, after remaining for the required length of time within the drying zone, the dried material is moved into a subsequent cooling zone through which fresh air is drawn from the outside which is thus preheated without any cost by the dried material which is cooling within this zone. This preheated fresh air then passes through a channel which terminates into the circulating channel of the drying zone after passing outwardly along the last part thereof in which a blower is mounted. It is quite evident that by preheating the fresh air very effectively and without any cost before adding it to the heated drying air which is circulating through the drying zone, the new drier will operate at a much lower cost than one of the previous driers to which the fresh air is supplied without first being heated and which therefore requires considerable energy for heating the entire circulating drying air within the drying zone to the required temperature. By conducting the preheated fresh air from the cooling zone through a channel which by-passes the blower within the circulating channel and terminates into the latter at a point prior to the blower, this preheated air passes directly into and through the circulating channel in the direction opposite to that in which the material to be dried is moved intermittently through the different zones of the drier. Consequently, the entire air, that is, the air already flowing through the circulating channel as well as the preheated fresh air then passes through the blower and the subsequent heating elements and thereafter passes along the stacked material within the drying zone and thus dries the material very effectively.

Further features of the invention consist in providing the drying zone within a closed chamber, while the preheating and cooling zones are enclosed within chambers which are open at their outer ends, in providing movable partitions between the preheating and drying zones and the drying and cooling zones which permit the drying zone to be closed entirely from one or both of the adjacent preheating and cooling zones during the drying operation and are adapted to be opened for moving the material from one chamber to the other, and in providing the partition between the preheating and drying zones with an opening of an adjustable size through which a part of the circulating drying air may be branched off and pass from the drying zone into and through the preheating zone so as to preheat and predry the material therein before it is moved into the actual drying zone.

Still another feature of the invention consists in mounting the blower within the circulating channel near the end of the drying zone adjacent to the cooling zone. This has the advantage that the fresh-air supply channel coming from the cooling zone may then be made as short as possible and that the temperature of the preheated air passing through this channel will not decrease considerable before entering the drying zone.

The features and advantages of the present invention will become more clearly apparent from the following detailed description thereof which is to be read with reference to the accompanying drawings, in which—

FIGURE 1 shows the first part of the drier, while

Figure 1:
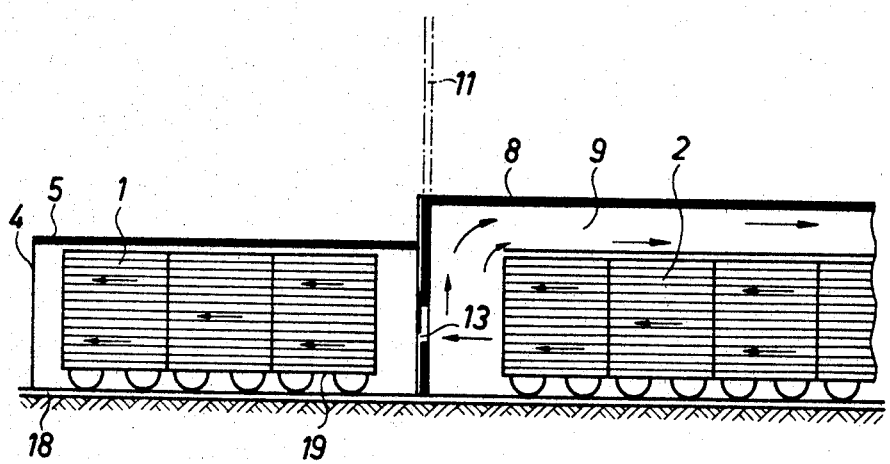
Figure 2:
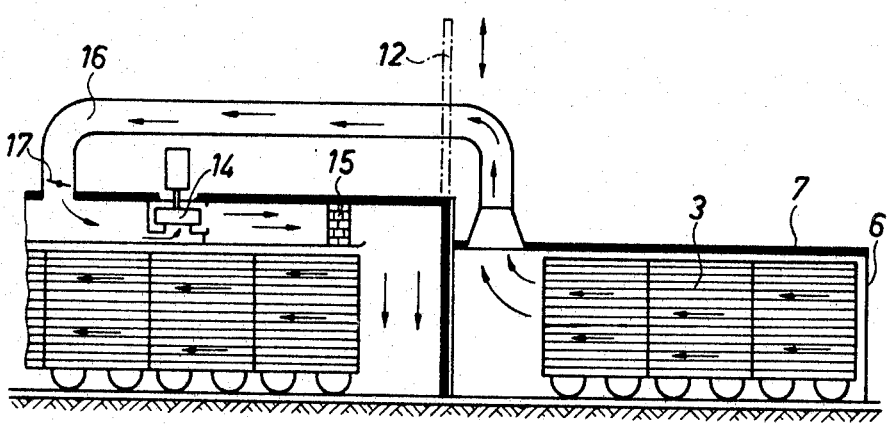
FIGURE 2 shows the second part which is connected to and shown as being broken off the first part.

As illustrated in these drawings, the drier according to the invention comprises a preheating zone 1, a drying zone 2, and a cooling zone 3. The preheating zone 1 is open at its front end 4 and enclosed at both sides by walls and above by a roof 5 which is spaced at a short distance from the material to be dried, for example, sawed timber. The cooling zone 3 is likewise open at its outer end 6 which forms the rear end of the drier, and it is likewise enclosed at both sides by walls and above by a roof 7 which is spaced at a short distance from the dried material. The drying zone 2 is provided within a drying chamber which has a higher roof 8 than the roofs 5 and 7 of the preheating and cooling zones 1 and 3. The space underneath this roof 8 forms a circulating channel 9, the lower side of which is located at approximately the same level as the roofs 5 and 7 of the preheating and cooling zones 1 and 3. The two ends of the drying zone 2 may be opened by vertical-lift doors 11 and 12 to permit the material to be moved from one zone to the other. Door 11 between the preheating zone 1 and the drying zone is provided with an opening 13 which is adjustable to different sizes and permits a certain part of the drying air to be passed from the drying zone 2 into and through the preheating zone 1.

Near its end facing the cooling zone 3, the circulating channel 9 contains a blower 14 and an air heater 15. An air inlet channel 16 starts at the end of the cooling zone 3 adjacent to the drying zone 2 and by-passes the heater 15 and the blower 14 before it terminates into the circulating channel 9. The amount of fresh preheated air passing through the inlet channel 16 into the circulating channel 9 may be regulated by an adjustable baffle 17. A pair of rails 18 extend through the entire drier so as to permit cars 19 carrying the material to be dried to be moved intermittently into and out of the drier and from one of its zones to the other.

The blower 14 circulates the air which is supplied thereto from the drying zone 2 and through the inlet channel 16 and which is thereafter heated by the heater 15. As indicated by the arrows, the heated air flows back through the drying zone 2 in the direction opposite to that in which the material to be dried is moved through the drier. At the rear end of the drying zone 2, the air is directed into the circulating channel 9 and a part of the drying air passes through the opening 13 into the preheating zone 1 from which it will then escape to the outside. Before the new air is supplied to the circulating channel 9 through the inlet channel 16, it is preheated within the cooling zone 2 by the dried material standing therein.

If the drier is made of a total length of about 40 m., the preheating and cooling zones 1 and 3 may each contain three stacks of material, while the drying zone 2 contains twelve stacks. The material to be dried is moved intermittently into and through the drier. The entire drying operation including the operation of stacking the material on the carriages may be carried out in a fixed cycle. The material may, for example, remain in each of the preheating and cooling zones 1 and 3 for the same length of time which is required for the stacking operation, while the period during which the material remains in the drying zone 2 may be a multiple of this time. If such a fixed-cycle operation is followed, the individual zones are preferably made of a length which depends upon the type of wood or other material to be dried and the amount of moisture which is to be evaporated from the material during the drying process.

In order to reduce the length of the drier as much as possible, it is also possible to design it so as to permit several lateral adjacent stacks to be moved simultaneously through the different zones of the drier.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A large air drier comprising a preheating zone, a drying zone, and a cooling zone successively behind each other, partitions adapted to separate said zones from each other and to be at least partly opened to permit the materials to be dried to be moved intermittently from one zone to the other, an air-circulating channel within said heating zone, at least one blower and heating means connected to said drying zone, and a channel connecting the rear end of said cooling zone with said circulating channel, whereby fresh air is drawn by said blower from the outside through said cooling zone containing the dried material for cooling therein and said fresh air is thereby preheated and is then drawn through said connecting channel to the suction side of said blower and passed into said circulating channel.

2. An air drier as defined in claim 1, in which said preheating and cooling zones are open at the outer ends of said drier, said partition between said preheating and drying zones being adapted to be partly opened to permit a part of the drying air to pass from said drying zone into and through said preheating zone.

3. An air drier as defined in claim 1, in which said preheating and cooling zones are open at the outer ends of said drier, said partition between said preheating and drying zones having an opening through which a part of the drying air may pass from said drying zone into and through said preheating zone, and means for varying the size of said opening and for closing the same.

4. An air drier as defined in claim 1, in which said connecting channel is relatively short by terminating into said circulating channel at a point near said partition between said drying and cooling zones.

5. An air drier as defined in claim 1, in which said blower and said heating means are at least partly disposed within said circulating channel at a point near said partition between said drying and cooling zones, said connecting channel being relatively short by terminating into said circulating channel closely adjacent to the suction side of said blower.

6. An air drier as defined in claim 1, further comprising control means for varying the effective aperture size of said connecting channel.

References Cited
UNITED STATES PATENTS

| | | | |
|---|---|---|---|
| 1,151,268 | 8/1915 | Hess | 34—174 XR |
| 2,409,298 | 10/1946 | Merrill | 34—66 |
| 2,906,627 | 9/1959 | Payton et al. | |

FREDERICK L. MATTESON, JR., *Primary Examiner.*

A. D. HERRMANN, *Assistant Examiner.*